United States Patent [19]
Phillips

[11] Patent Number: 4,623,963
[45] Date of Patent: Nov. 18, 1986

[54] DEVICE INDEPENDENT DATA TRANSFER

[75] Inventor: Grady H. Phillips, Colleyville, Tex.

[73] Assignee: International Business Machines Corp., Armonk, N.Y.

[21] Appl. No.: 517,692

[22] Filed: Jul. 27, 1983

[51] Int. Cl.[4] ............................................ C06F 13/00
[52] U.S. Cl. .................................................... 364/300
[58] Field of Search ......................................... 364/300

[56] References Cited

U.S. PATENT DOCUMENTS 4,541,019  9/1985  Precourt .......................... 364/200 X Primary Examiner—James R. Hoffman
Attorney, Agent, or Firm—C. Lamont Whitham

[57] ABSTRACT

UNLOAD and LOAD utility programs (24) in computer system memory (16) are used to transfer user and system data from one set of direct access storage devices (10, 12, 14) to the same or another set of direct access storage devices. The originating or sending system is off-loaded as a single complete entity by a system command to a sequential media (FIG. 3) following the Initial Program Loadable system load program. The system load program, when Initial Program Loaded on the receiving system, determines the new hardware configuration and alters the loaded system control information to reflect the new device types and device addresses and loads the system to the new DASD configuration and prepares it for normal processing on the new system.

5 Claims, 5 Drawing Figures

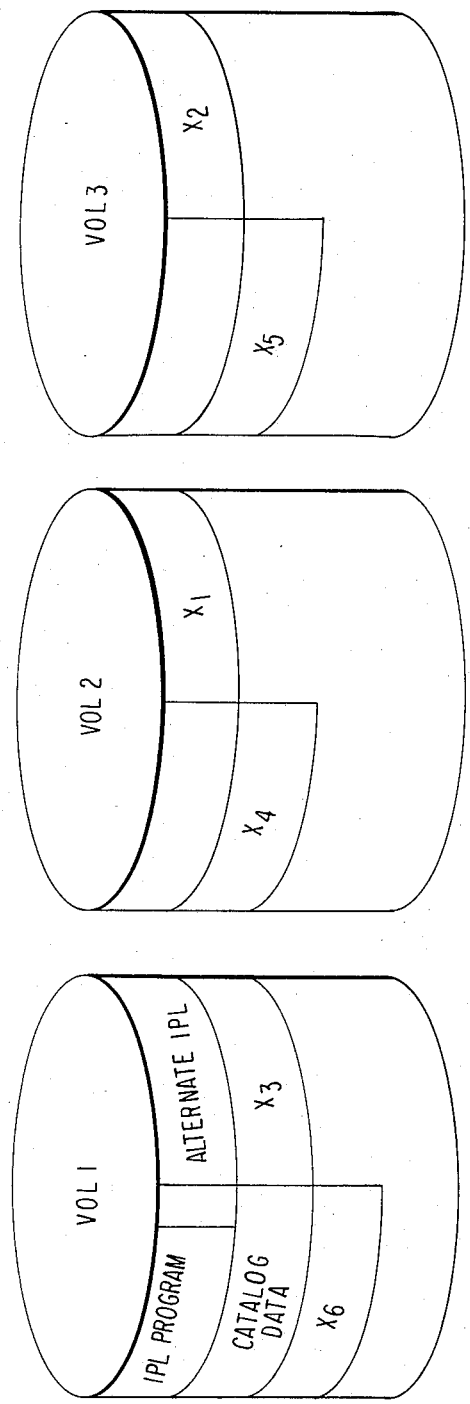

DEVICE INDEPENDENT DATA TRANSFER

FIELD OF THE INVENTION

The present invention addresses the problems involved in delivering software products in the form of Initial Program Loadable (IPL) control programs and those problems occurring when a loaded System is to be moved to a different configuration of Direct Access Storage Devices (DASD)

BACKGROUND OF THE INVENTION

An operating system, sometimes called a supervisor, is a program which supervises and controls the operation of a computer. Operating systems are normally delivered on removable direct access device storage media or on a sequentially organized media that is a backup dump of a running system. In both situations, the receiving hardware must match the sending system exactly in terms of devices containing the system data. Normally, sending systems allow for the device addresses to be one of several alternatives by system generating extra devices. The above restriction requires careful human planning and often extra person weeks in system generation procedures.

Several utilities exist which will dump the contents of a physical direct access storage device to tape and restore the contents to another device of the original type. Examples of these utilities include DDR (DASD Dump Restore service program), a stand-alone program, and IEHDASDR which runs under the MVS Multiple Virtual storage operating system. These utilities all dump and restore from and to single devices (or portions of single devices) and cannot be used to move data from one device type to another.

Several utilities exist which can be used to dump specific data sets from direct access devices to tape and to restore the data sets to direct access devices. IEHMOVE, IEBCOPY and IEBGENER are examples of these utilities which run under MVS. These utilities are designed to allow the transfer of data sets from one device type to another and to process one or more types of data set organization. No utility, however, is capable of addressing all the standard data set organizations and none are capable of dumping a user defined data set organization.

The BACKUP/RESTORE utility will dump and restore the system libraries for the Disk Operating System (DOS). This utility allows for the transfer of these libraries from one device type to another but is restricted to DOS libraries and will not process user data sets.

None of these utilities have the capability of processing all of the data associated with an operating system and its users and allowing the transfer of the data from one device type to another.

SUMMARY OF THE INVENTION

According to the present invention, the sending system is off-loaded as a single complete entity by a system command to a sequential media following an IPLable system load program. The system load program, when IPLed by the receiver of the system, determines the new hardware configuration and alters the loaded system control information to reflect the new device types and device addresses during the system loading process. More specifically, the entire collection of data for an operating system, including all system and all user data, is organized and stored on a set of direct access storage devices in a manner such that it can be converted and condensed into a logical and continuous data stream which is independent of the number and characteristics of the direct access storage devices in the set and of the structure and content of the data. This continuous data stream is recorded on a set of sequential storage media such as magnetic tape. At a later time, the continuous data stream is retrieved from the sequential storage media, expanded and converted to the original data organization, and recorded on a set of direct access storage devices which may or may not match the original set in either number or type. While there may be no physical correlation between the representation of the data on the original and restored copies, the representation will be logically identical and indistinguishable by any component of the operating system or any user accessing the data except for perhaps response time differences caused by the physical characteristics of the direct access storage devices used. By using the invention, detailed planning and attention are reduced, and data organization and device formatting restrictions are removed, thus opening system configurations to a full range of interchangeable devices.

BRIEF DESCRIPTION OF THE DRAWINGS

The foregoing and other objects, aspects and advantages of the invention will be better understood from the following detailed description of the invention with reference to the accompanying drawings, in which:

FIG. 2A is a chart showing an extract of section identification lists in the first collection record on volume one in the example shown in FIG. 2;

FIG. 4 is a pictorial illustration of three direct access storage devices showing a typical organization of data sets on the three volumes as a result of the LOAD utility program according to the invention.

DETAILED DESCRIPTION OF THE INVENTION

The invention is described in terms of specific examples and devices, but it will be understood by those skilled in the art that the invention can be practiced using functionally equivalent procedures and devices. There are, however, certain system characteristics that create an environment for the UNLOAD/LOAD Utility Programs according to the invention to perform their respective functions. These characteristics are as follows:

1. All physical records on the Direct Access Storage Device (DASD) volumes are of the same system defined record length (fixed length). Each record is therefore locatable via a relative record number which is an offset from the beginning of the volume. Each DASD volume in turn is assigned by the system a volume identification allowing every usable DASD record in the system to be locatable by an address consisting of the volume ID and relative record number. This address is referred to as a Page Identification (PID) since the records are paged in and out by the System paging supervisor. A system specified number of adjacent addressable DASD records are grouped into individually allocatable units called sections. The first record of each section is addressable by a special PID known as the Section Identification (SID). All system and user data is mapped into the fixed length records.

2. The system initialization program, DASD configuration information data, and alternate initialization program are located in records at known relative record positions on the system IPL DASD volume.

3. All other system and user data is organized into entities called collections which are locatable via the system catalog. Data within the catalog contains the SID of the first record within each collection. The first record of each collection contains an SID list and "in use" maps indicating which of the records are actually "in use" (filled with useful data) and their relative order within the collection. The system catalog itself is a collection and follows the same format.

4. All access methods within the system refer to data by collection name and relative offset of the data bytes from the collection origin. The system converts that offset to the addressable record on DASD via the collection SID list and Input/Output (I/O) control blocks for the DASD volume. (The list position of the SID implies the relative offset within the collection.)

Figure 1:
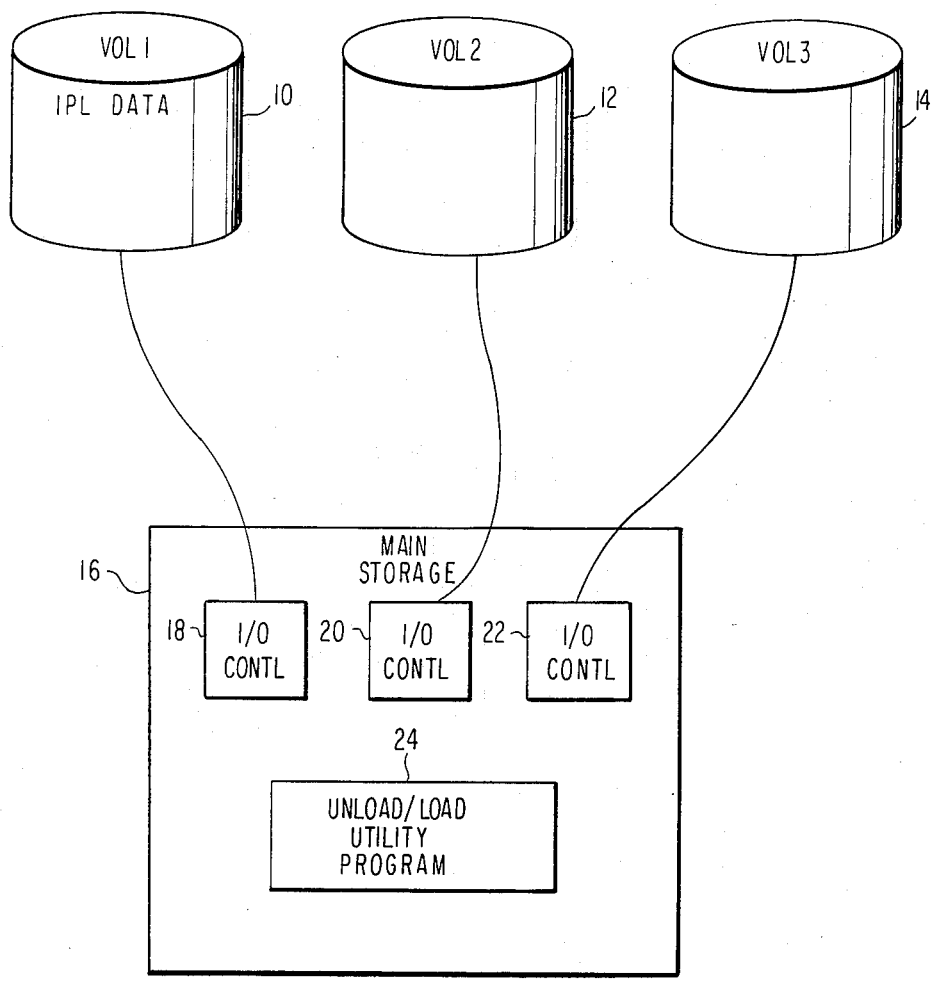
FIG. 1 is a block diagram showing an example of the relation of a plurality of direct access storage devices to the computer main storage to illustrate the operation of the UNLOAD utility program according to the invention.

FIG. 1 illustrates the relation of a plurality of DASD volumes to the computer main storage. Three volumes are shown for purposes of illustration, but there could be more or less depending upon specific system configuration. It will be understood that the volumes shown could be magnetic disk media, magnetic cylinder media, optical disk media or similar direct access storage media. The first volume 10, denoted as volume one, contains the IPL data. Data collections are distributed between this volume and the second and third volumes 12 and 14, denoted respectively as volumes 2 and 3. The computer main storage 16 contains I/O control blocks 18, 20 and 22 for each of the DASD volumes 10, 12 and 14. In the practice of the present invention, the UNLOAD or LOAD utility programs are also loaded into the computer main storage as indicated at 24. These two programs are both contained within a single executable program module in the system program libraries.

Figure 2:
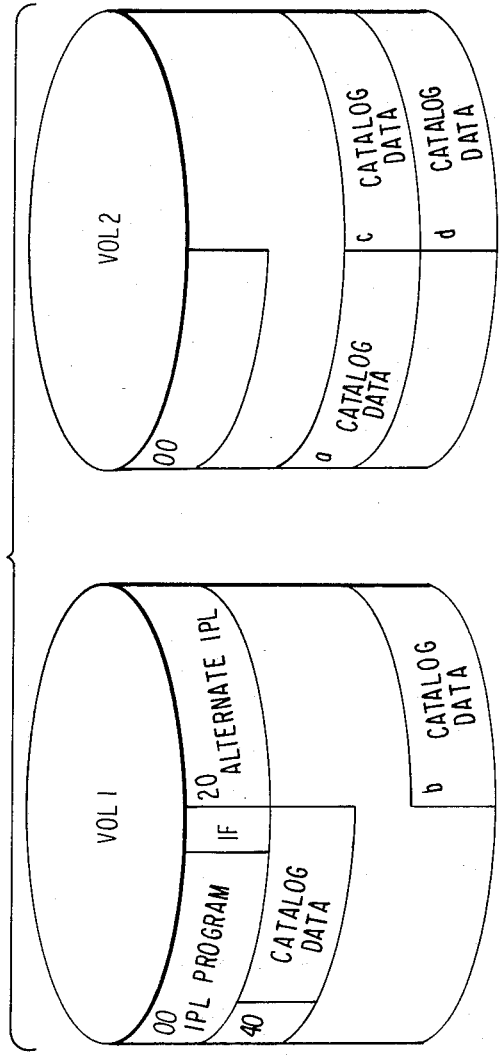
FIG. 2 is a pictorial illustration of two direct access storage devices showing an exemplary organization of data sets on the two volumes.

FIG. 2 illustrates a typical data collection configuration that may occur on two DASD volumes. The first data block at relative page identification location 00 HEX on volume one contains the IPL program. This is followed at relative location 1F HEX with configuration data and then at relative location 20 HEX, the alternate IPL program. At relative location 40 HEX on volume one is the system catalog. This is the first collection record, and an extract is illustrated in the table of FIG. 2A. Each SID represents a system determined number of adjacent records on the designated volume. The first page (page 0) of the collection contains SID lists; the collection data starts at the next page (page 1) and continues using the SID list positions to determine the relative order of pages (records) within the collection. Thus, with reference to FIG. 2, the first record is located on volume one at relative location 40 HEX, the next record is located on volume two at location a, where "a" represents a relative HEX location, and so on. In the example shown in FIGS. 2 and 2A, the last relative record location used is 2,d, the remaining catalog locations being unassigned.

The UNLOAD utility program is activated by the operator at an appropriate time during the normal system initialization processing. When the system determines all parts of the DASD data collections are present and consistent, a prompting display will be presented to the operator on the main system console. This prompt allows the operator to select several options in addition to the continuation of the normal System processing. If the operator selects the "unload" option, normal processing is aborted, the UNLOAD utility is loaded into the computer main storage 16 (FIG. 1), and given control.

The UNLOAD utility assumes control of the entire hardware system, establishing I/O routines. Via the main system console, the UNLOAD utility requests the address of the output sequential access device (typically a magnetic tape drive) and any additional options to be acted upon by either the UNLOAD or LOAD utilities. Upon receiving correct information, the utility writes Initial Program Load (IPL) bootstrap data consistent with the output device to the sequential media followed by the LOAD utility program that will be used for subsequent loading of the system to the new DASD configuration.

Using the host System I/O control blocks 18, 20 and 22 in the example shown in FIG. 1, UNLOAD locates the DASD volume 10 used to IPL the system and all other DASD data volumes 12 and 14. I/O blocks and buffers are constructed for the UNLOAD I/O supervisor. The utility then begins copying the "in use" parts of the system and user data from DASD to the sequential media omitting DASD records which are not currently claimed for use by the access methods on behalf of the system or user programs. As each DASD record is copied, a sequential number is appended along with status information so that the LOAD utility will be able to ensure the new DASD configuration receives a complete and consistent system. Each record is compressed and packed into the output records in a manner best suitable to the output device, conserving space on the sequential media and time of transfer. If multiple output volumes are required, the operator is informed and given the opportunity to place a new output volume on the device or select an alternate device containing a pre-mounted volume. Control information is written on the output volumes so that the LOAD utility will be able to uniquely identify the set of volumes, determine the order of volumes, detect missing records, and ensure the volume set to be complete. DASD records are copied as follows:

1. The system initialization program located in DASD records known to the Utility is copied from DASD to the sequential media.

2. The system DASD configuration information data located in DASD records known to the utility is copied from DASD to the sequential media.

3. The system alternate initialization program located in DASD records known to the utility is copied from DASD to the sequential media.

4. The first record of the system catalog collection located in a DASD record known to the utility is copied from DASD to the sequential access media. The first record SID lists and "in use" maps are used to locate and copy all "in use" system catalog data records from DASD to the sequential media.

5. The utility begins reading logical records contained in the system catalog extracting the location of the first collection record for each collection in the system. As each collection is located, the SID list and map are used to locate and copy all "in use" data records from DASD to the sequential access media. (Some collection data may be omitted based upon control information set by the system or operator option selection.)

Figure 3:
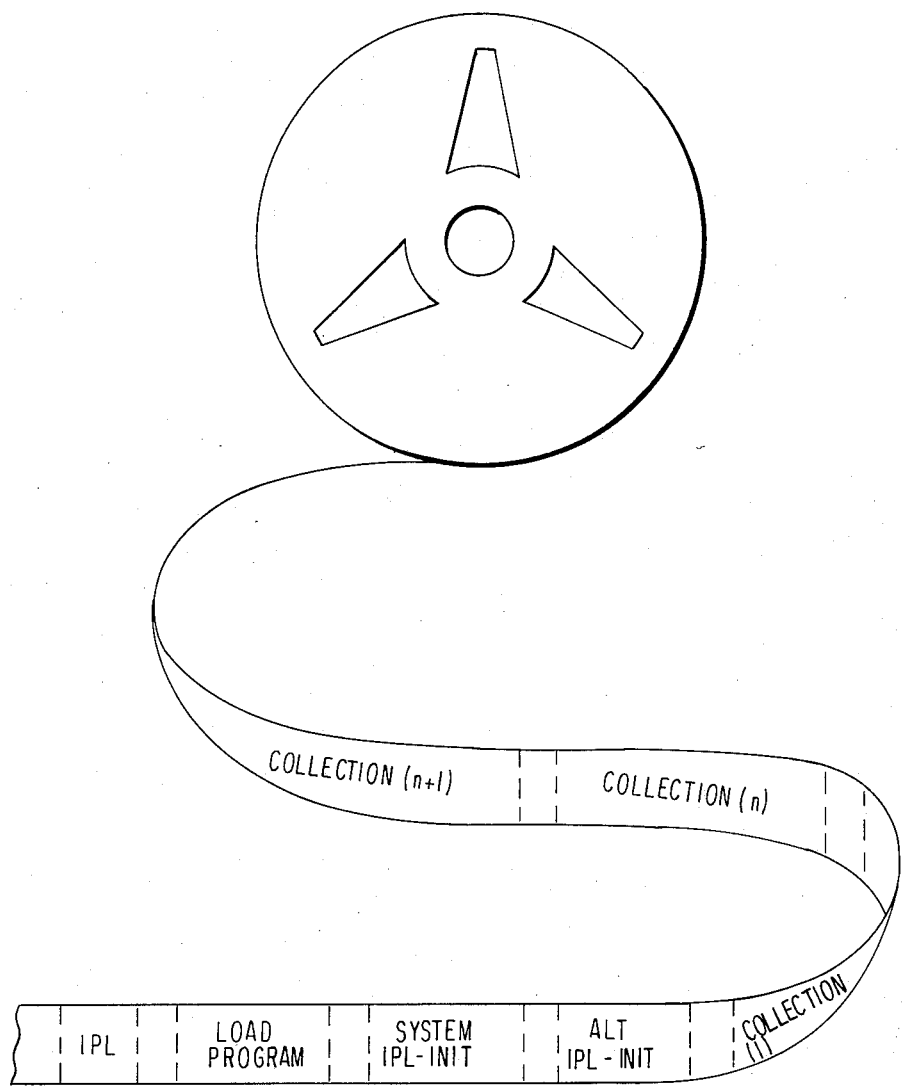
FIG. 3 is a pictorial illustration of a magnetic tape showing the sequential organization of the data unloaded from the direct, access storage devices shown in FIG. 1.

FIG. 3 illustrates a magnetic tape to which has been written the data from DASD. The tape contains IPL data for the LOAD utility program, the LOAD utility program, system initialization, and collections in relative collection record order. Note that the IPL data for the LOAD utility program and the LOAD utility are not compressed although all system data and collections are compressed and packed on the tape. When the end of the system catalog is encountered, the utility completes all output to the sequential access media, sets End of File indicators, informs the operator, and waits. The operator may then re-IPL the system and continue normal processing.

The magnetic tape(s) or other sequential media written to by the UNLOAD utility can be physically moved to another computer system having the same or different hardware configuration. The first record of each collection on the sequential access media (including the system catalog) contains the original allocation SID lists and "in use" maps for the collection. The records will be read from the sequential access device(s) during the load operation, decompressed, checked to ensure the new system is complete and consistent, and copied to the new DASD configuration. The SID lists will be altered to match the new DASD configuration. In the case where the DASD configuration of the receiving system is identical to that of the originating or sending system, the system is loaded with the sequential access media and the data collections are relocated following the LOAD utility procedure which assigns DASD space to the collections. The SIDs and the DASD volume time stamps will be changed.

When the operator places the first (or only) sequential access media volume on an appropriate receiving system device and IPLs the device, the IPL bootstrap data and LOAD program is read into main computer storage 16 (FIG. 1) and given control. The LOAD utility program determines the input device (passed by the hardware) and builds I/O control blocks for reading the device. The utility waits for the operator to press an interrupt key on the main system console. Upon receiving the interrupt, the utility goes into conversation mode prompting and reading information from the operator. Through the conversation, the new DASD devices are located and prepared for receiving the system and user data. Volume identifications are determined and labels are written which will allow the system initialization programs to ensure the DASD volumes are complete, unique, and consistent. The LOAD utility builds internal I/O control blocks and buffers as required.

When the operator has completed the DASD definitions, the LOAD utility begins reading the input device and placing the useful data on the DASD volumes as follows:

1. The system initialization program is copied to the new DASD IPL volume in the same relative record position as in the source system. Note that the cylinder number, head number, and record number may not be the same.

2. The system DASD configuration information data is copied to the new DASD IPL volume in the same relative record position as in the source system. The identifications of the DASD volumes and main system console will be altered later to reflect the new configuration.

3. The system alternate initialization program is copied to the new DASD IPL volume in the same relative record position as in the source system.

4. The collections are copied to the new DASD configuration. The first system catalog record is assigned to a specific location on the IPL volume along with the rest of the records contained within the same DASD section. All other collection data including the first record of each collection is assigned SID locations as determined by the LOAD program. These assignments are such that all DASD data volumes in the set defined by the operator receive collection data in a "round robin" manner thus reducing access time during later normal system processing. This round robin assignment is illustrated in FIG. 4 which shows three DASD volumes. Note that the first data allocation denoted X1 is on volume two following the first catalog allocation on volume one. In other words, there is no regard for the assignments of the originating system. The second data allocation denoted X2 is on volume three and so on. The SID lists are set to reflect the assignments and the system catalog data is updated to locate the first record in each collection. Processing continues for all collections defined to the originating system omitting collections which the UNLOAD utility has indicated to be omitted.

5. The system configuration information is updated to reflect the main system console and DASD configuration. Certain other information in the initialization and configuration records may be reset depending upon the original specifications of the operator that activated the UNLOAD utility.

6. Based on the IPL volume device type, appropriate IPL bootstrap data is written to the IPL volume.

When the foregoing processes have been completed, the LOAD utility program will have completed the preparation of the System for normal running. Using the IPL bootstrap data, the LOAD utility simulates an IPL and passes control to the normal system routines. The newly installed system initialization takes over for normal processing using the DASD and console information defined by the operator.

I claim:

1. A method of organizing and transferring intermingled user and system data from one set of computer storage devices to another, said method comprising:

organizing all system and user data associated with a computer operating system in a manner independent of the number or characteristics of the set of computer storage devices and of the structure and content of the data;

converting and condensing all system and user data associated with said computer operating system into a logical and continuous data stream;

storing said data after converting and storing said data after converting and condensing on intermediate sequential access media; and transferring said data stored on said intermediate sequential access media to the same or another set of computer storage devices, formatted and organized according to the characteristics of said same or another set of computer storage devices but without regard for original assignments of said data on said computer storage devices.

2. A method of off-loading the entire collection of data for a computer operating system, including all system and all user data, from direct access computer storage devices on an originating system and transferring the off-loaded collection as a single complete entity to a receiving system independent of the configuration of the direct access computer storage devices on the receiving system, said method comprising:

writing initial program load bootstrap data to sequential access media followed by a load utility program that will be used for subsequent loading of the system to a new direct access computer storage device configuration;

locating the direct access storage device volume used to initial program load the system and all other direct access computer storage device data volumes;

next copying the system initialization program located in a direct access computer storage device record of the originating system to said sequential access media followed by the system direct access computer storage device configuration information and the system alternate initialization program located in direct access storage device records of the originating system;

then copying the system catalog collection located in direct access computer storage device records of the originating system to said sequential access media, the first record of said system catalog collection containing lists and maps indicating the locations of data records in direct access computer storage device volumes of the originating system;

using said lists and maps, copying all system catalog direct access computer storage device records of the originating system omitting direct access computer storage device records which are not currently claimed for use;

then reading said system catalog logical record data locating the first record of each system and user collection, the first record of said collections containing lists and maps indicating the locations of data records in direct access computer storage device volumes in the originating system; and using said lists and maps for each said collection in turn, copying all system and user collections located in the direct access computer storage device records of the originating system in logical order to said sequential access media omitting direct access computer storage device records which are not currently claimed for use by the access methods on behalf of the system or user programs.

3. The method according to claim 2 further comprising:

appending to each direct access storage device record copied a sequential number and status information to be used by the load utility program to ensure the new direct access storage device configuration receives a complete and consistent system; and compressing and packing each direct access storage device record copied to said sequential media.

4. The method according to claim 2 further comprising:

transferring said sequential media to the same or another receiving system;

specifying the location and identification labels of the direct access storage device volumes of said receiving system;

copying from said sequential media the system initialization program to the direct access storage device initial program load volume of said receiving system followed by the system configuration information data and the system alternate initialization program; and then copying from said sequential media the system catalog and the remaining data collections to said direct access storage devices of said receiving system in logical order.

5. The method according to claim 4 wherein said last step of copying is performed assigning direct access storage section locations in round robin fashion among a plurality of direct access storage device volumes in said receiving system.

* * * * *